(12) United States Patent
Olsson et al.

(10) Patent No.: US 10,534,526 B2
(45) Date of Patent: Jan. 14, 2020

(54) AUTOMATIC SCROLLING BASED ON GAZE DETECTION

(71) Applicant: Tobii AB, Danderyd (SE)

(72) Inventors: Anders Olsson, Stockholm (SE); Mårten Skogö, Danderyd (SE)

(73) Assignee: Tobii AB, Danderyd (SE)

( * ) Notice: Subject to any disclaimer, the term of this patent is extended or adjusted under 35 U.S.C. 154(b) by 22 days.

(21) Appl. No.: 15/851,292

(22) Filed: Dec. 21, 2017

(65) Prior Publication Data

US 2018/0181272 A1    Jun. 28, 2018

Related U.S. Application Data

(63) Continuation of application No. 13/802,240, filed on Mar. 13, 2013, now Pat. No. 9,864,498.

(51) Int. Cl.
*G06F 3/0485* (2013.01)
*G06K 9/00* (2006.01)
(Continued)

(52) U.S. Cl.
CPC .......... *G06F 3/0485* (2013.01); *G06F 1/1686* (2013.01); *G06F 3/013* (2013.01); *G06K 9/00604* (2013.01)

(58) Field of Classification Search
CPC .... G06F 3/013; G06F 3/0485; G02B 27/0093
See application file for complete search history.

(56) References Cited

U.S. PATENT DOCUMENTS 5,390,281 A    2/1995  Luciw et al.
5,471,542 A   11/1995  Ragland
(Continued)

FOREIGN PATENT DOCUMENTS

CN    105339866 A    2/2016
EP      0903662 A2    3/1999
(Continued)

OTHER PUBLICATIONS

U.S. Appl. No. 14/195,755, filed Mar. 3, 2014 Final Rejection dated Jun. 1, 2018, all pages.
(Continued)

*Primary Examiner* — Jeffery A Brier
(74) *Attorney, Agent, or Firm* — Samuel I. Yamron

(57) ABSTRACT

Disclosed are various embodiments for automatic scrolling of content displayed on a display device in response to gaze detection. Content may be displayed in a window rendered on a display screen. Gaze detection components may be used to detect that a user is gazing at the displayed content and to determine a gaze point relative to the display screen. At least one applicable scroll zone relative to the display screen and a scroll action associated with each applicable scroll zone may be determined. In response to determining that the gaze point is within a first applicable scroll zone, an associated first scroll action may be initiated. The first scroll action causes the content to scroll within the window until at least one of: expiration of a defined period, determining that a portion of the content scrolls past a defined position within the window, determining that the gaze point is outside of the first scroll zone, and detecting an indicator that the user begins reading the content.

18 Claims, 7 Drawing Sheets

(51) Int. Cl.
*G06F 1/16* (2006.01)
*G06F 3/01* (2006.01)

(56) References Cited

U.S. PATENT DOCUMENTS

| | | |
|---|---|---|
| 5,731,805 A | 3/1998 | Tognazzini et al. |
| 5,850,211 A | 12/1998 | Tognazzini |
| 6,011,555 A | 1/2000 | Eckhoff et al. |
| 6,021,403 A | 2/2000 | Horvitz et al. |
| 6,067,565 A | 5/2000 | Horvitz |
| 6,085,226 A | 7/2000 | Horvitz |
| 6,204,828 B1 | 3/2001 | Amir et al. |
| 6,233,570 B1 | 5/2001 | Horvitz et al. |
| 6,260,035 B1 | 7/2001 | Horvitz et al. |
| 6,262,730 B1 | 7/2001 | Horvitz et al. |
| 6,351,273 B1 | 2/2002 | Lemelson et al. |
| 6,393,584 B1 | 5/2002 | McLaren et al. |
| 6,421,064 B1 | 7/2002 | Lemelson et al. |
| 6,578,962 B1 | 6/2003 | Amir et al. |
| 6,603,491 B2 | 8/2003 | Lemelson et al. |
| 6,734,845 B1 | 5/2004 | Nielsen et al. |
| 6,873,314 B1 | 3/2005 | Campbell |
| 6,882,354 B1 | 4/2005 | Nielsen |
| 6,886,137 B2 | 4/2005 | Peck et al. |
| 7,013,258 B1 | 3/2006 | Su et al. |
| 7,091,928 B2 | 8/2006 | Rajasingham |
| 7,113,170 B2 | 9/2006 | Lauper et al. |
| 7,346,195 B2 | 3/2008 | Lauper et al. |
| 7,486,302 B2 | 2/2009 | Shoemaker |
| 7,572,008 B2 | 8/2009 | Elvesjo et al. |
| 7,614,011 B2 | 11/2009 | Karidis et al. |
| 7,630,254 B2 | 12/2009 | Lutze |
| 7,630,524 B2 | 12/2009 | Lauper et al. |
| 7,634,528 B2 | 12/2009 | Horvitz et al. |
| 7,792,391 B2 | 9/2010 | Arima |
| 8,094,122 B2 | 1/2012 | Molander et al. |
| 8,226,574 B2 | 7/2012 | Whillock et al. |
| 8,235,529 B1 | 8/2012 | Raffle et al. |
| 8,339,446 B2 | 12/2012 | Blixt et al. |
| 8,407,263 B2 | 3/2013 | Elad et al. |
| 8,564,533 B2 | 10/2013 | Yuan |
| 8,620,913 B2 | 12/2013 | Hough et al. |
| 8,643,680 B2 | 2/2014 | Baldwin et al. |
| 8,756,516 B2 | 6/2014 | Singh et al. |
| 8,762,846 B2 | 6/2014 | Kellerman et al. |
| 8,786,953 B2 | 7/2014 | Wheeler et al. |
| 8,963,806 B1 | 2/2015 | Starner et al. |
| 9,377,863 B2 | 6/2016 | Bychkov et al. |
| 9,400,553 B2 | 7/2016 | Kerr et al. |
| 9,423,870 B2 | 8/2016 | Teller et al. |
| 9,423,871 B2 | 8/2016 | Sukumar |
| 9,454,225 B2 | 9/2016 | Bychkov et al. |
| 9,478,143 B1 | 10/2016 | Bowen |
| 9,480,397 B2 | 11/2016 | Larsen |
| 9,619,020 B2 | 4/2017 | George-Svahn et al. |
| 9,864,498 B2 | 1/2018 | Olsson et al. |
| 2002/0032696 A1 | 3/2002 | Takiguchi et al. |
| 2002/0105482 A1 | 8/2002 | Lemelson et al. |
| 2002/0180799 A1 | 12/2002 | Peck et al. |
| 2003/0020755 A1 | 1/2003 | Lemelson et al. |
| 2003/0052903 A1 | 3/2003 | Weast |
| 2003/0067446 A1 | 4/2003 | Ono |
| 2003/0098954 A1 | 5/2003 | Amir et al. |
| 2004/0175020 A1 | 9/2004 | Bradski et al. |
| 2004/0199663 A1 | 10/2004 | Horvitz et al. |
| 2005/0030322 A1 | 2/2005 | Gardos |
| 2005/0047629 A1 | 3/2005 | Farrell et al. |
| 2005/0197763 A1 | 9/2005 | Robbins et al. |
| 2005/0221268 A1 | 10/2005 | Chaar et al. |
| 2006/0066567 A1 | 3/2006 | Scharenbroch et al. |
| 2006/0087502 A1 | 4/2006 | Karidis et al. |
| 2006/0174213 A1 | 8/2006 | Kato |
| 2006/0192775 A1 | 8/2006 | Nicholson et al. |
| 2006/0256133 A1 | 11/2006 | Rosenberg |
| 2007/0078552 A1 | 4/2007 | Rosenberg |
| 2007/0122064 A1 | 5/2007 | Arima |
| 2007/0132663 A1 | 6/2007 | Iba et al. |
| 2007/0164990 A1 | 7/2007 | Bjorklund et al. |
| 2007/0219732 A1 | 9/2007 | Creus et al. |
| 2007/0279591 A1 | 12/2007 | Wezowski et al. |
| 2008/0074389 A1 | 3/2008 | Beale |
| 2008/0114614 A1 | 5/2008 | Mahesh et al. |
| 2008/0130950 A1 | 6/2008 | Miklos et al. |
| 2008/0148149 A1 | 6/2008 | Singh et al. |
| 2008/0270474 A1 | 10/2008 | Flake et al. |
| 2008/0281915 A1 | 11/2008 | Elad et al. |
| 2008/0320418 A1 | 12/2008 | Huang et al. |
| 2009/0146950 A1 | 6/2009 | Maringelli |
| 2009/0245600 A1 | 10/2009 | Hoffman et al. |
| 2009/0273562 A1 | 11/2009 | Baliga et al. |
| 2009/0315827 A1 | 12/2009 | Elvesjö et al. |
| 2010/0079508 A1 | 4/2010 | Hodge et al. |
| 2010/0125816 A1 | 5/2010 | Bezos |
| 2010/0182232 A1 | 7/2010 | Zamoyski |
| 2010/0225668 A1 | 9/2010 | Tatke et al. |
| 2010/0245093 A1 | 9/2010 | Kobetski et al. |
| 2010/0295774 A1 | 11/2010 | Hennessey |
| 2011/0045810 A1 | 2/2011 | Issa et al. |
| 2011/0115703 A1 | 5/2011 | Iba et al. |
| 2011/0115883 A1 | 5/2011 | Kellerman et al. |
| 2011/0119361 A1 | 5/2011 | Issa et al. |
| 2011/0175932 A1 | 7/2011 | Yu et al. |
| 2011/0270123 A1 | 11/2011 | Reiner |
| 2012/0011170 A1 | 1/2012 | Elad et al. |
| 2012/0050273 A1 | 3/2012 | Yoo et al. |
| 2012/0105486 A1 | 5/2012 | Lankford et al. |
| 2012/0256967 A1 | 10/2012 | Baldwin et al. |
| 2012/0272179 A1 | 10/2012 | Stafford |
| 2013/0044055 A1 | 2/2013 | Karmarkar et al. |
| 2013/0106674 A1* | 5/2013 | Wheeler ............. G02B 27/017 345/8 |
| 2013/0132867 A1 | 5/2013 | Morris et al. |
| 2013/0135196 A1 | 5/2013 | Park et al. |
| 2013/0169560 A1 | 7/2013 | Cederlund et al. |
| 2013/0176208 A1 | 7/2013 | Tanaka et al. |
| 2013/0176250 A1 | 7/2013 | Lee et al. |
| 2013/0229368 A1 | 9/2013 | Harada |
| 2013/0267317 A1 | 10/2013 | Aoki et al. |
| 2013/0275883 A1 | 10/2013 | Bharshankar et al. |
| 2013/0283208 A1 | 10/2013 | Bychkov et al. |
| 2013/0300637 A1 | 11/2013 | Smits et al. |
| 2013/0300654 A1 | 11/2013 | Seki |
| 2013/0321400 A1 | 12/2013 | Van Os et al. |
| 2014/0002352 A1 | 1/2014 | Jacob et al. |
| 2014/0019136 A1 | 1/2014 | Tanaka |
| 2014/0026098 A1 | 1/2014 | Gilman |
| 2014/0104197 A1 | 4/2014 | Khosravy et al. |
| 2014/0126782 A1 | 5/2014 | Takai et al. |
| 2014/0168054 A1 | 6/2014 | Yang et al. |
| 2014/0184550 A1 | 7/2014 | Hennessey et al. |
| 2014/0191948 A1 | 7/2014 | Kim et al. |
| 2014/0195918 A1 | 7/2014 | Friedlander |
| 2014/0211995 A1 | 7/2014 | Model |
| 2014/0247208 A1 | 9/2014 | Henderek et al. |
| 2014/0247210 A1 | 9/2014 | Henderek et al. |
| 2014/0247215 A1 | 9/2014 | George-Svahn et al. |
| 2014/0247232 A1 | 9/2014 | George-Svahn et al. |
| 2014/0268054 A1 | 9/2014 | Olsson et al. |
| 2014/0334666 A1 | 11/2014 | Lankford et al. |
| 2015/0009238 A1 | 1/2015 | Kudalkar |
| 2015/0138079 A1 | 5/2015 | Lannsjö |
| 2015/0138244 A1 | 5/2015 | George-Svahn et al. |
| 2015/0143293 A1 | 5/2015 | George-Svahn et al. |
| 2015/0149956 A1 | 5/2015 | Kempinski et al. |
| 2016/0116980 A1 | 4/2016 | George-Svahn et al. |
| 2017/0083088 A1 | 3/2017 | Lannsjö et al. |
| 2017/0177078 A1 | 6/2017 | Henderek et al. |
| 2017/0177079 A1 | 6/2017 | George-Svahn et al. |

FOREIGN PATENT DOCUMENTS

| | | |
|---|---|---|
| EP | 0816980 B1 | 1/2001 |
| EP | 1646026 A2 | 4/2006 |
| EP | 1812881 A1 | 8/2007 |

(56) References Cited

FOREIGN PATENT DOCUMENTS

| | | |
|---|---|---|
| EP | 1832753 A2 | 9/2007 |
| EP | 1970649 A1 | 9/2008 |
| EP | 2048326 A2 | 4/2009 |
| EP | 2075430 B1 | 7/2010 |
| EP | 2613224 A2 | 7/2013 |
| EP | 2752733 A1 | 7/2014 |
| EP | 2762997 A2 | 8/2016 |
| EP | 3088997 A1 | 11/2016 |
| GB | 2490864 A | 11/2012 |
| KR | 2016-0005013 A | 1/2016 |
| WO | 92/02880 A1 | 2/1992 |
| WO | 98/03907 A1 | 1/1998 |
| WO | 2006/045843 A1 | 5/2006 |
| WO | 2010/051037 A1 | 5/2010 |
| WO | 2010/127714 A1 | 11/2010 |
| WO | 2010/132991 A1 | 11/2010 |
| WO | 2010/141403 A1 | 12/2010 |
| WO | 2012/145180 A1 | 10/2012 |
| WO | 2012/138744 A1 | 11/2012 |
| WO | 2013/033842 A1 | 3/2013 |
| WO | 2013/144807 A1 | 10/2013 |
| WO | 2013/168171 A1 | 11/2013 |
| WO | 2013/168173 A1 | 11/2013 |
| WO | 2014/134623 A1 | 9/2014 |

OTHER PUBLICATIONS

U.S. Appl. No. 14/547,087, filed Nov. 18, 2014 Final Rejection dated Apr. 16, 2018, all pages.
U.S. Appl. No. 14/547,089, filed Nov. 18, 2014 Non-Final Rejection dated May 11, 2018, all pages.
U.S. Appl. No. 14/600,896, filed Jan. 20, 2015 Final Rejection dated Jun. 22, 2018, all pages.
U.S. Appl. No. 15/367,453, filed Dec. 2, 2016 Non-Final Rejection dated Jul. 17, 2018, all pages.
U.S. Appl. No. 15/449,058, filed Mar. 3, 2017 Non-Final Rejection dated May 11, 2018, all pages.
"Adjacent", Dictionary.com, http://dictionary.reference.com/browse/adjacent, Nov. 18, 2011, 1 page.
U.S. Appl. No. 15/446,843, "Final Office Action", dated Feb. 26, 2018, 16 pages.
European Patent Application No. 14716455.2, "Office Action", dated Sep. 30, 2016, 5 pages.
European Patent Application No. 14716455.2, "Office Action", dated Feb. 20, 2018, 6 pages.
European Patent Application No. 16174545.0, "Extended European Search Report", dated Oct. 4, 2016, 7 pages.
European Patent Application No. 16174545.0, "Office Action", dated Jul. 1, 2016, 1 page.
European Patent Application No. 97304371.4, "Extended European Search Report", Sep. 9, 1998, 5 pages.
Korean Patent Application No. 10-2015-7027213, "Office Action", dated Oct. 7, 2015, 3 pages.
Kumar et al., "Gaze-enhanced Scrolling Techniques", ACM, UIST'07, Oct. 7-10, 2007, 4 pages.
PCT/US1997/010856, "International Search Report and Written Opinion", dated Jul. 16, 1998, 4 pages.
PCT/US2014/020024, "International Preliminary Report on Patentability", dated Sep. 11, 2015, 11 pages.
PCT/US2014/020024, "International Search Report and Written Opinion", dated Jul. 29, 2014, 15 pages.

* cited by examiner

AUTOMATIC SCROLLING BASED ON GAZE DETECTION

CROSS REFERENCE TO RELATED APPLICATIONS

This application is a continuation of U.S. patent application Ser. No. 13/802,240, filed Mar. 13, 2013, the entire disclosure of which is incorporated by reference herein for all purposes.

BACKGROUND

Gaze detection relates to the monitoring or tracking of eye movements to detect a person's gaze point. Various types of gaze detection systems and methods are known. For example products sold by Tobii Technology AB operate by directing near infrared illumination towards a user's eye and detecting reflection of the infrared illumination from the user's eye using an image sensor. Such a gaze detection system is described in U.S. Pat. No. 7,572,008. Other alternative gaze detection systems are also known, such as those disclosed in U.S. Pat. Nos. 6,873,314 and 5,471,542.

A gaze detection system can be employed as a user input mechanism for a computing device, using gaze detection to generate control commands. Eye control can be applied as a sole interaction technique or combined with other control commands input via keyboard, mouse, physical buttons and/or voice. It is now feasible to add gaze detection technology to many mobile computing devices, smart phones and tablet computers, and personal computers. Most standard-type web cameras and cameras integrated into mobile computing devices have a resolution of a few million pixels, which provides sufficient optical quality for eye-tracking purposes, Most mobile computing devices and personal computers also have sufficient processing power and memory resources for executing gaze detection software.

SUMMARY OF THE INVENTION

The following systems and methods provide solutions for automatic scrolling of displayed content in response to gaze detection. Content is displayed in a window rendered on a display screen. Gaze detection components may be used to detect that a user is gazing at the displayed content and to determine a gaze point relative to the display screen. In some cases, images of at least one facial feature of the user may be captured, such as at least one of a nose, a mouth, a distance between two eyes, a head pose and a chin, and at least one facial feature may be used in determining the gaze point.

At least one applicable scroll zone relative to the display screen and a scroll action associated with each applicable scroll zone may be determined. An interface may be provided to allow the user to define at least one scroll point and the scroll point may be used to define the applicable scroll zone(s). In response to determining that the gaze point is within a first applicable scroll zone, an associated first scroll action is initiated. In some instances, statistical analysis may be applied to gaze data patterns to determine that the gaze point is within the first applicable scroll zone. In some examples, a first scroll point may be displayed when the gaze point is determined to be within the first scroll zone and may be hidden when the gaze point is determined to be outside of the first scroll zone or when the user is determined to be reading the content.

The first applicable scroll zone may be defined as an area at the bottom of the display screen and the associated first scroll action may be defined as a scroll down action. In response to determining that the gaze point is within a second applicable scroll zone, which may be defined as an area at the top of the display screen, an associated second scroll action, such as a scroll up action, may be initiated. In other cases, a scroll zone may be defined as an area away from the display screen.

The first scroll action may cause the content to scroll within the window until at least one of: expiration of a defined period, determining that a portion of the content scrolls past a defined position within the window, determining that the gaze point is outside of the first scroll zone, and detecting an indicator that the user begins reading the content. In some examples, in response to termination of the first scroll action, a subsequent scroll action may not be initiated until after expiration of a defined time period. In other examples, in response to termination of the first scroll action the size of a scroll zone may be temporarily decreased or moved.

Additional features, advantages, and embodiments may be set forth in or apparent from consideration of the following detailed description, drawings, and claims. Moreover, it is to be understood that both the foregoing summary and the following detailed description are provided by way of example only and intended to provide further explanation without limiting the scope of the claimed subject matter.

BRIEF DESCRIPTION OF THE DRAWINGS

Many aspects of the present disclosure can be better understood with reference to the following diagrams. The drawings are not necessarily to scale, emphasis instead being placed upon clearly illustrating certain features of the disclosure. Moreover, in the drawings, like reference numerals designate corresponding parts throughout the several views.

DETAILED DESCRIPTION

It is to be understood that the subject matter disclosed and claimed herein is not limited to the particular methodology, protocols, etc. described herein, as the skilled artisan will recognize that these may vary in different embodiments. The embodiments disclosed herein and the various features and advantageous details thereof are explained more fully with reference to the non-limiting embodiments and examples that are illustrated in the accompanying drawings and detailed in the following description. Descriptions of well-known components and computing techniques may be omitted so as to not unnecessarily obscure the described embodiments. The examples used herein are intended merely to facilitate an understanding of ways in which the subject matter disclosed and claimed herein may be practiced and to further enable those of skill in the art to practice various embodiments.

Disclosed are various embodiments of systems and associated devices and methods for implementing automatic scrolling of content rendered on a display screen based on gaze detection. Gaze detection is also sometimes referred to as eye-tracking. As will be appreciated, gaze detection systems include hardware and software components for detecting eye movements, generating data representing such eye movements, and processing such data to determine a gaze point relative to a display screen or other object. By way of example, a gaze point can be expressed in terms of coordinates in a coordinate system.

Certain embodiments of the present invention are described herein with respect to camera-based gaze detection systems, but it should be understood that the invention is also applicable to any available or later-developed gaze detection systems. For example, embodiments of the invention may rely on gaze detection system that employ infrared-sensitive image sensors and collimated infrared sources to determine gaze points. Other embodiments may rely additionally or alternatively on face or body position tracking devices or other systems that enable at least directional input into a computing device that can be used to control the device. Embodiments of the present invention have particular application in mobile computing devices, such as mobile phones, smart phones, tablet computers, e-readers, personal digital assistants, personal gaming devices, media players and other handheld or laptop computer devices. In other embodiments, the invention may be used with other computing devices, including desktop computers, mainframe personal computers, set top boxes, game consoles, and the like.

Figure 1:
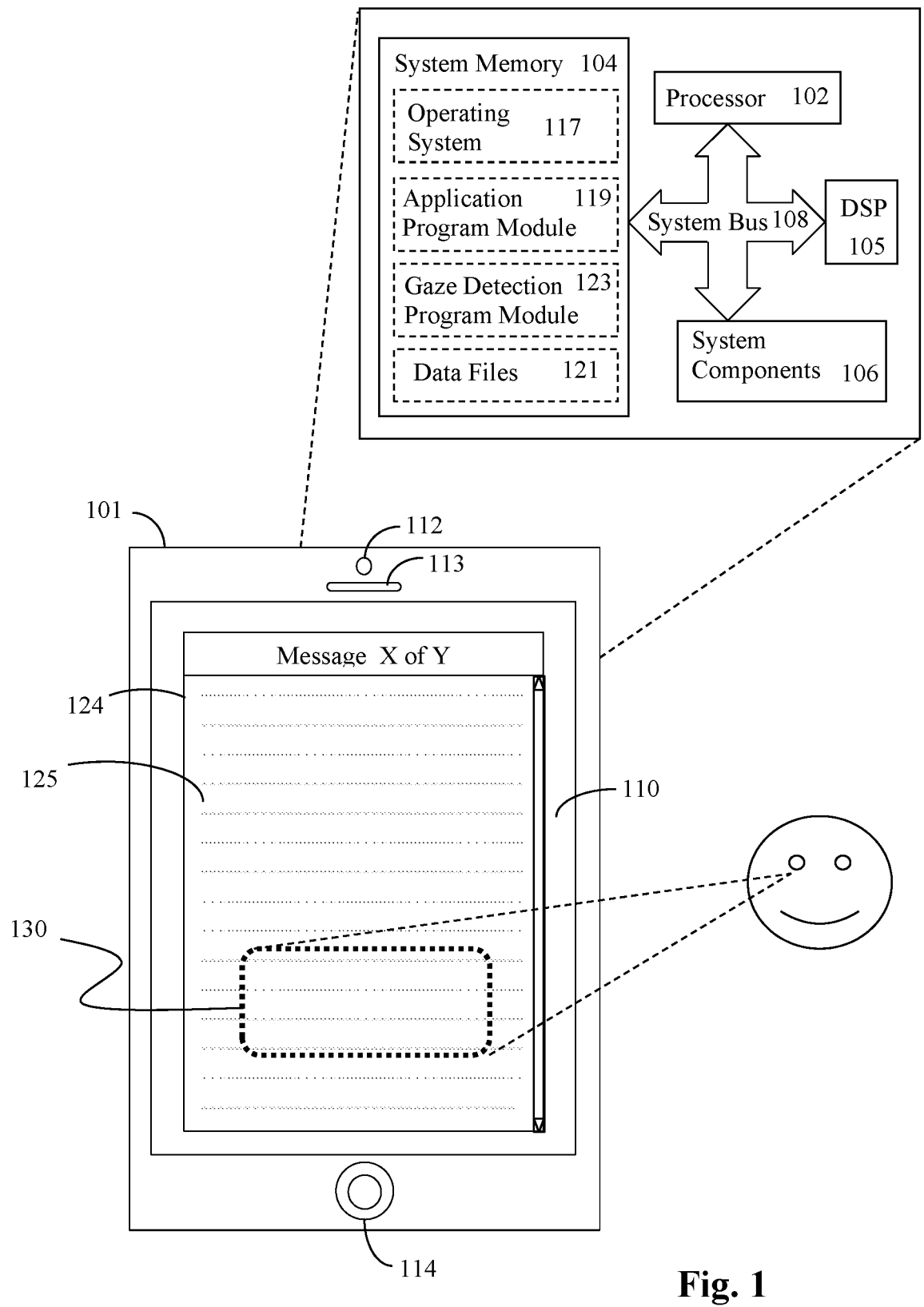
FIG. 1 is a block diagram illustrating an example of a computing device used in accordance with some embodiments of the present invention.

FIG. 1 is a block diagram illustrating an example of computing device 101 used in accordance with some embodiments of the present invention. Typical components of such a computing device 101 include a processor 102, a system memory 104, and various system interlace components 106. As used in this discussion, the term "processor" can refer to any type of programmable logic device, including a microprocessor or any other type of similar device. The processor 102, system memory 104 and system interface components 106 may be functionally connected via a system bus 108. The system interface components 106 may enable the processor 102 to communicate with integrated or peripheral components and/or devices, such as a display screen 110 (which may include touch screen capabilities), a camera 112, an input device, such as a control button 114 or physical keyboard, wired and/or wireless communication components, speaker(s) and other output components, etc.

In the embodiment shown, the camera 112 is integrated with the computing device 101. In other embodiments, the camera 112 may be a peripheral or add-on device that is attached to or used in proximity to the computing device 101. A camera 112 may be configured for capturing still images and/or video. Images or video captured by the camera 112 may be used for gaze detection, as will be described. In some embodiments, other gaze detection components may be connected to and/or integrated with the computing device 101 via appropriate system interface components 106.

A number of program modules may be stored in the system memory 104 and/or any other computer-readable media associated with the computing device 101. The program modules may include, among others, an operating system 117, various application program modules 119 and a gaze detection program module 123. In general, and for purposes of the present discussion, an application program module 119 includes computer-executable code for rendering images, text and other content 125 within a window 124 or other portion of the display screen 110 and for receiving and responding to user input commands (e.g., supplied via a gaze detection system, touch screen, camera, keyboard, control button 114, microphone 113, etc.) to manipulate such displayed content 125. Non-limiting examples of application program modules include browser applications, email applications, messaging applications, calendar applications, e-reader applications, word processing applications, presentation applications, etc.

A gaze detection program module 123 may include computer-executable code for detecting gaze points, saccades and/or other indicators of the user reading rather than gazing (e.g. eye fixation or dwelling on or around a constant point on the display) and other eye tracking data and for calculating positions of gaze points relative to the display screen 110. A gaze detection program module 123 may further include computer-executable code for controlling and receiving signals from a camera 112 or the components of other gaze detections. In other words, the gaze detection program module 123 may control the activation/deactivation and any configurable parameters of the camera 112 and may receive signals from the camera 112 representing images or video captured or detected by the camera 112. The gaze detection program module 123 may process such signals so as to determine reflection of light on the cornea or other portion of an eye, pupil location and orientation, pupil size or other metric for determining a location on a screen that is being viewed by an eye and use such information to determine the coordinates of a gaze point 130.

In some cases, camera based gaze detection systems may rely on facial recognition processing to detect facial features such as nose, mouth, distance between the two eyes, head pose, chin etc. Combinations of these facial features may be used to determine the gaze point 130. For instance in embodiments where vertical scrolling (a scroll up action and/or a scroll down action) is to be done based on face images from the camera 112, the detection of the gaze point 130 relies solely on the detected eyelid position(s). In other words, when the user gazes at the lower portion of the display screen 110, the eye will be detected as being more closed, whereas when the user gazes at the top of the display screen 110, the eye will be detected as being more open.

Eye lid position detection is good for determining changes in gaze points in a vertical direction, but not as effective for determining changes in gaze points in a horizontal direction. For better determining changes in gaze points in a horizontal direction, images of the head pose may be used instead. In such cases, gaze points may be determined to be within scroll zones only when the user's face is determined to be oriented in the general direction of the display screen 110. As general rule, whenever a user looks at an object more than 7 degrees off from his direct forward line of sight, he will immediately turn his head in the direction of that object. Thus a head pose indicating more than 7 degrees off to a side from the display screen 110 is an indication that the user is unlikely to be looking at the displayed content 125.

As used herein, the term "gaze point" is intended to represent an area or region relative to the display screen 110 to which the user's gaze is directed. Depending on the sensitivity and accuracy of the gaze detection components, which may be dictated by camera resolution, processing power, available memory, and the like, a gaze point 130 may occupy a smaller (more sensitive/accurate) or larger (less sensitive/accurate) area relative to the display screen 110. Calibration of the gaze detection components may also play a role in the accuracy and sensitivity of gaze punt calculations. Accuracy or sensitivity may dictate the relationship between an actual gaze point and a projected gaze point. The actual gaze point is the point relative to a display at which the user is actually looking, and the projected gaze point is the point relative to a display that the gaze detection program module 123 determines as the gaze point. One advantage of the present invention is that it functions even if the relationship between the actual and projected gaze points is not direct.

In some embodiments, the actual gaze may be calibrated with the projected gaze point by using touch data, input via a touch screen, to assist with calibration. For example, the gaze detection program module 123 or another process executed on the computing device 101 may be configured for prompting the user to look at and touch the same point(s) on the display screen. The detected gaze point will represent the projected gaze point and the detected touch point will represent the actual gaze point. Alternatively, such a calibration process may be performed in the background without prompting the user or interrupting the user's normal interaction with the computing device 101. For example, as the user normally operates the computing device 101 he/she will be pressing buttons, hyperlinks, and other portions of the content 125, display screen 110 and/or computing device 101 having known positions. The user will normally also be looking at the buttons, hyperlinks, etc. at the same time. Thus, gaze detection program module 123 or other process may recognize the touch point as the actual gaze point and then correct any discrepancies between the actual gaze point and the projected gaze point. Such a background calibration process can be helpful in order to slowly improve calibration as the user interacts with the computing device over time.

In some embodiments, one or more light sources may be added around, or in proximity to the display screen 110 to provide more illumination to an eye, so as to enhance the sensitivity and accuracy of the gaze detection program module 123. An example of using light sources to improve the sensitivity of an eye tracking system is shown in U.S. Pat. No. 8,339,446. Further, in some embodiments, illumination found in the user's own environment, so-called ambient illumination, may be used to enhance the sensitivity and accuracy of the gaze detection program module 123. Additionally the light source(s) will cause reflections in the eyes of the user that may be used as one of the features when determining the gaze point 130.

In some embodiments the computing device 101 may include a digital signal processing (DSP) unit 105 for performing some or all of the functionality ascribed to the gaze detection program module 123. As is known in the art, a DSP unit 105 may be configured to perform many types of calculations including filtering, data sampling, triangulation and other calculations with respect to data signals received from an input device such as a camera 112 or other sensor. The DSP unit 105 may include a series of scanning imagers, digital filters, and comparators implemented in software. The DSP unit 105 may therefore be programmed for calculating gaze points 130 relative to the display screen 110, as described herein. A DSP unit 105 may be implemented in hardware and/or software. Those skilled in the art will recognize that one or more graphics processing unit (GPU) may be used in addition to or as an alternative to a DSP unit 105.

In some embodiments, the operating system 117 of a computing device may not provide native support for interpreting gaze detection data into input commands. Therefore, in such cases, the gaze detection program module 123 may be configured to initiate a scroll action by interacting with an application program module 129 to pass the application program module 129 a scroll command emulating one that is recognized by the application program module 129 (e.g., a mouse wheel scroll or a mouse click and drag, touch and swipe actions or gestures, activation of page up/page down buttons or other commands).

The gaze detection program module 123 and/or DSP unit 105 and/or one or more GPU in combination with the camera 112 is referred to generally herein as a gaze detection system. As mentioned, other types of gaze detection systems may be connected to and/or integrated with the computing device 101. The processor 102, which may be controlled by the operating system 117, can be configured to execute the computer-executable instructions of the various program modules, including the gaze detection program module 123, an application program module 119 and the operation system 117. The methods of the present invention may be embodied in such computer-executable instructions. Furthermore, the images or other information displayed by an application program module 119 and data processed by the gaze detection system may be stored in one or more data files 121, which may be stored on any computer readable medium associated with the computing device 101.

Figure 2:
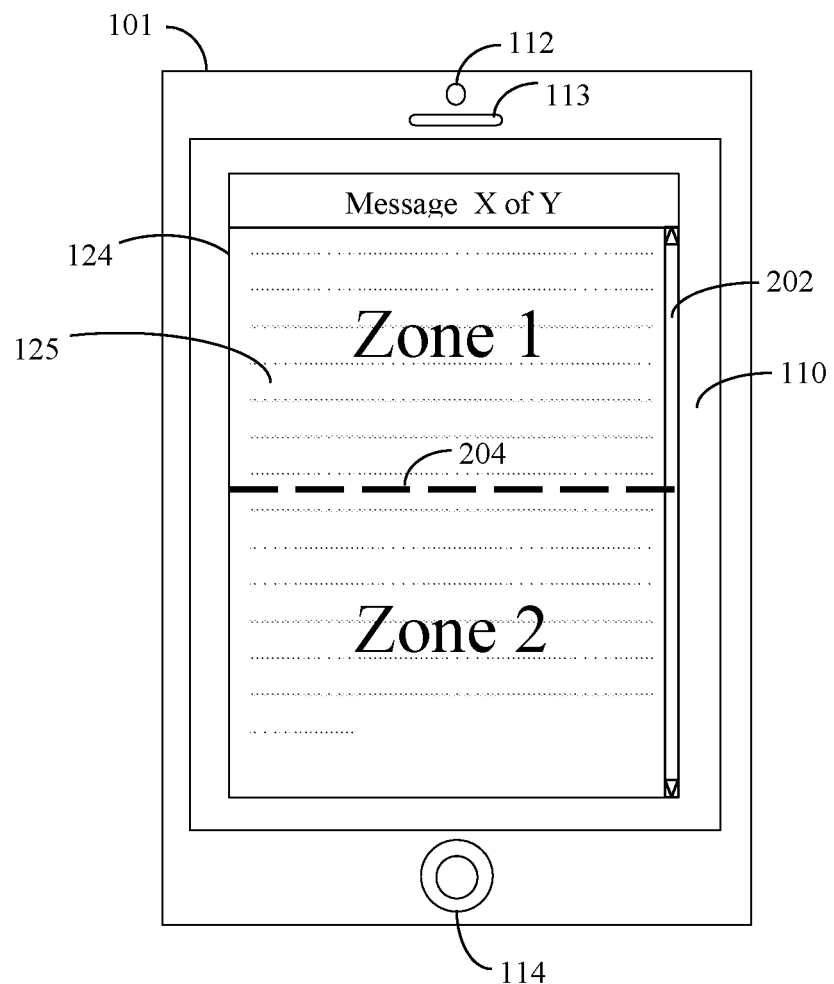
FIGS. 2-6 show examples of various user interfaces of exemplary computing devices for implementing automatic scrolling in response to gaze detection, in accordance with some embodiments of the present invention.

In some embodiments, the gaze detection program module 123 may be configured for determining one or more scroll zones relative to the display screen 110 or relative to a window 124 or other portion of the display screen 110 that displays content 125. Scroll zones may also or alternatively be defined in locations away from the display screen 112, e.g., below or to the side of the display screen 110. In FIG. 2, a window 124 having vertically scrollable content 125 rendered on the display screen 110 (as denoted by vertical scroll bar 202) is shown as being horizontally divided by a virtual divider 204. As used herein, the term "virtual divider" is intended to mean a divider that is not a part of the displayed content 125, but rather is displayed in front of or behind the content 125 or is not displayed at all. In some embodiments, virtual dividers may be displayed only when the gaze detection system determines that the user is gazing at the window 124, as opposed to reading content 125 within the window. These and other manners for displaying and/or hiding virtual dividers will occur to those of ordinary skill in the art.

A virtual divider may be of any suitable geometry (e.g., a line, a rectangle, polygon, point, etc.) and may be defined by coordinates relative to the widow 124 and/or the display screen 110. In some embodiments, the gaze detection program module 123 sets the coordinates of the virtual divider 204 to be approximately in the middle of the window 124 (i.e., approximately equally between the top and bottom of the window 124), thus defining an upper scroll zone ("Zone 1") and a lower scroll zone ("Zone 2") of the window 124. It should be appreciated that the upper Zone 1 and lower Zone 2 do not need to be of approximately equal area; any relative areas will suffice as long as they result in usable scroll zones. Preferably, the geometry of the virtual divider 204 and/or the locations of the scroll zones will result in a "dead zone" in the middle of the window 124 or display screen 110 to ensure that measurement errors and data noise do not cause opposite scroll actions to be initiated in succession while the gaze point 130 remains in the same position. As another alternative, a hysteresis may be implemented to attempt to avoid the same problem.

The gaze detection program module 123 may further be configured for associating certain scroll actions with the defined zones of the window 124. By way of example, a "scroll up" action may be associated with the upper Zone 1 of the exemplary window 124 and a "scroll down" action may be associated with the lower Zone 2 of the exemplary window 124. A scroll action may be defined in terms of scrolling (i.e., moving the content 125 relative to the window 124) for a determined period of time (e.g., a number of seconds or fractions thereof) or for a predetermined distance, until a gaze point 130 is detected as being moved within or outside of a defined scroll zone of the window 124, only when it is determined that the user is not reading or his/her eyes are otherwise determined to be still for a determined period of time, or until a particular portion of the content 125 passes a certain position within the window 124 (which, for example may be defined as a percentage of the size of the window 124). In some embodiments the size of the scroll zone may dictate the scroll distance or scroll time. For instance, a gaze point detected in a relatively smaller scroll zone may translate to a relatively smaller scroll distance or a relatively shorter scroll time. Conversely, a gaze point detected in a relatively larger scroll zone may translate to a relatively larger scroll distance or a relatively longer scroll time.

In some embodiments, it is preferable to configure the gaze detection program module 123 such that scroll actions may be initiated even when the user is determined to be reading. For instance when the user is looking at a map the scrolling (or "panning") must be initiated relatively faster than when the user is reading text. Thus the dwell time before triggering a scroll action when reading text may be longer than for reviewing maps and other graphical content, and the scroll zones may be chosen differently in each case. For example, the scroll zone(s) may have to be made larger in the case of a map or other graphical content in order to make the gaze detection system sufficiently responsive, while scroll zone(s) for a text document may be smaller because a scroll action is typically not required until the user is reading text very close (e.g., 5 lines) to the bottom or top of the window 124.

In cases where a scroll action is initiated in response to detecting a gaze point 130 within a defined scroll zone for a determined period of time and the scroll action is terminated when the gaze point is determined to have moved outside of that scroll zone, a time-out mechanism may be implemented, such that automatic scrolling is not initiated again (even if a gaze point is subsequently determined to be in a defined scroll zone) until after expiration of a defined time period, which may be a number of seconds or fractions thereof. In addition or in the alternative, after a first scroll action is terminated, the size of one or more scroll zones may be at least temporarily decreased, such that a more deliberate gaze point is required to initiate a subsequent scrolling action. In some embodiments, the gaze detection program module 123 may be configured to allow a user to alter (e.g. by way of a control panel or other interface) the sensitivity of a scroll action (e.g., the size or position of the scroll zone, and/or how fast and/or how far the content 125 scrolls) and/or the period of time the gaze point must remain in a scroll zone to initiate a scroll action and/or actions to take following termination of a scroll action.

For instance, a "scroll up" action may be defined in terms of moving the content 125 downward relative to the window 124 until the portion of the content 125 that was previously at or near the top of lower Zone 2 (prior to scrolling) reaches the bottom or near the bottom of the window 124 or otherwise reaches a predefined position within the window 124. Similarly, a "scroll down" action may be defined in terms of moving the content 125 upward relative to the window 124 until the portion of the content 125 that was previously at or near the bottom of upper Zone 1 (prior to scrolling) reaches the top or near the top of the window 124 or otherwise reaches a predefined position within the window 124. Continuing a scroll action until a portion of the content 125 reaches a predefined position within the window 124 may be advantageous for a gaze detection system of lower robustness, i.e. meaning that the a gaze detection system fairly often loses data and may require a fairly long sampling time to determine gaze points with a reasonable degree of certainty. In embodiments where scroll actions are initiated in connection with a user reading content 125, this is easy to achieve because as the person reads content close to the bottom of the window 124 he is likely to keep his gaze in that area for several seconds, thus allowing for tens or maybe even hundreds of gaze samples before determining to initiate a scroll action.

It will be appreciated that scrolling actions may be defined in various ways and that different definitions may be used in connection with different application program modules 119, different window 124 sizes and/or different types of computing devices 101 (e.g., based on screen size, image or text resolution, etc.)

The gaze detection program module 123 may also be configured for determining whether a detected gaze point 130 is within one of the defined zones of the window 124 and, in response, which scrolling action to implement. With reference to the example of FIG. 2, detecting a gaze point 130 within Zone 1 would cause the gaze detection program module 123 to initiate an associated scroll up action and detecting a gaze point 130 within Zone 2 would cause the gaze detection program module 123 to initiate an associated scroll down action.

In some embodiments, the gaze detection program module 123 may be configured such that scrolling based on gaze detection (referred to herein as "scroll mode") is always enabled. In other embodiments, the gaze detection program module 123 may be configured such that scroll mode may be enabled/disabled in response to user commands. Exemplary user commands for enabling/disabling scroll mode may include activation of a button 114 or other actuator, input of a voice command via a microphone 113, interaction with a touch screen or keyboard, shaking or moving the computing device 101 in a particular fashion (if suitable motion detector components are included), a specified gesture, specified eye movements, or gazing at a defined region on or away from the display screen 110, etc. In certain embodiments, scrolling actions are initiated in response to gaze detection only if an associated user input command (e.g., a voice command) is simultaneously or contemporaneously detected.

In some embodiments, the gaze detection program module 123 may be configured to differentiate between a user gazing (e.g., for purposes of triggering a scroll action) and a user reading displayed content 125. For example, known techniques include detecting and evaluating saccades and whether an eye fixates or dwells on or around a constant point on the display. This information may be used to determine indicators of reading as distinguished from a more fixed gaze. In some embodiments, the gaze detection program module 123 may be configured to use gaze data patterns (e.g., the frequency with which gaze points appear in certain positions) to determine with greater accuracy, based on statistical analysis, when an actual gaze point is within a defined scroll zone. This approach is particularly useful in connection with relatively small scroll zones, which may be due to relatively small window 124 and/or display screen 110 sizes.

Figure 6:
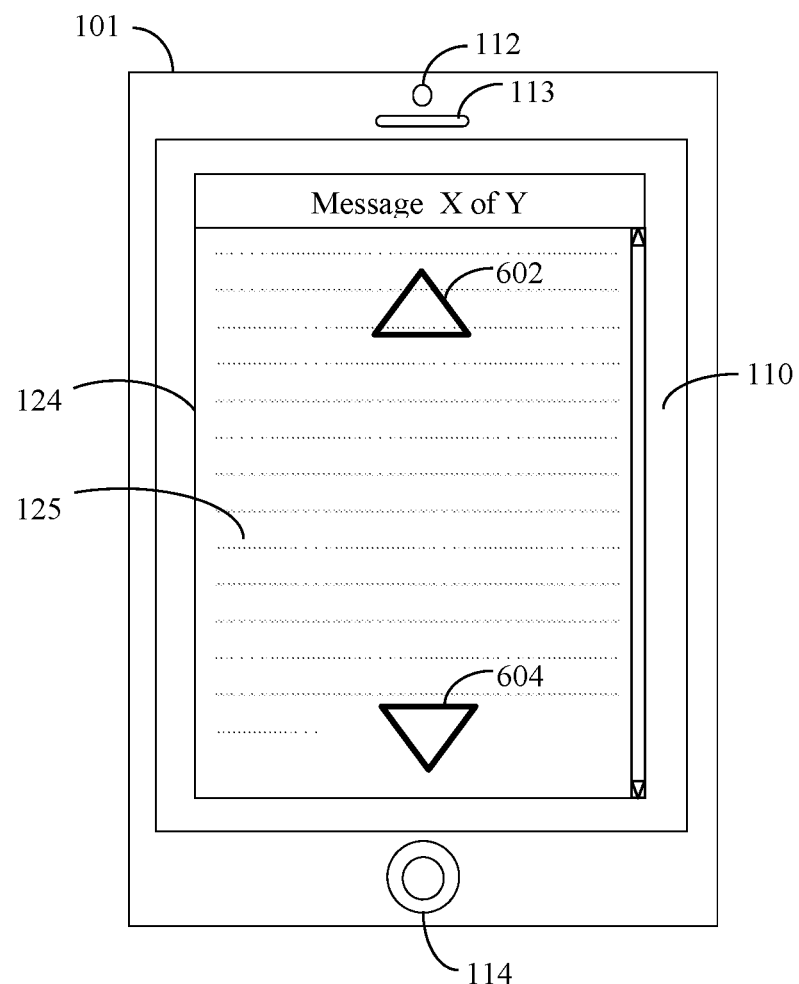

In some embodiments, the gaze detection program module 123 may further be configured for determining whether a detected gaze point 130 remains within a particular scroll zone (or within a defined position relative to a configurable scroll point, as discussed with reference to FIGS. 6 and 7) for at least a defined period of time (referred to herein as a "threshold time"). For example, the threshold time may be defined as a number of seconds or fractions thereof. If the gaze point 130 remains within the particular scroll zone beyond expiration of the threshold time, the scroll action associated with the zone is initiated; otherwise the scroll action is not initiated.

Figure 3:
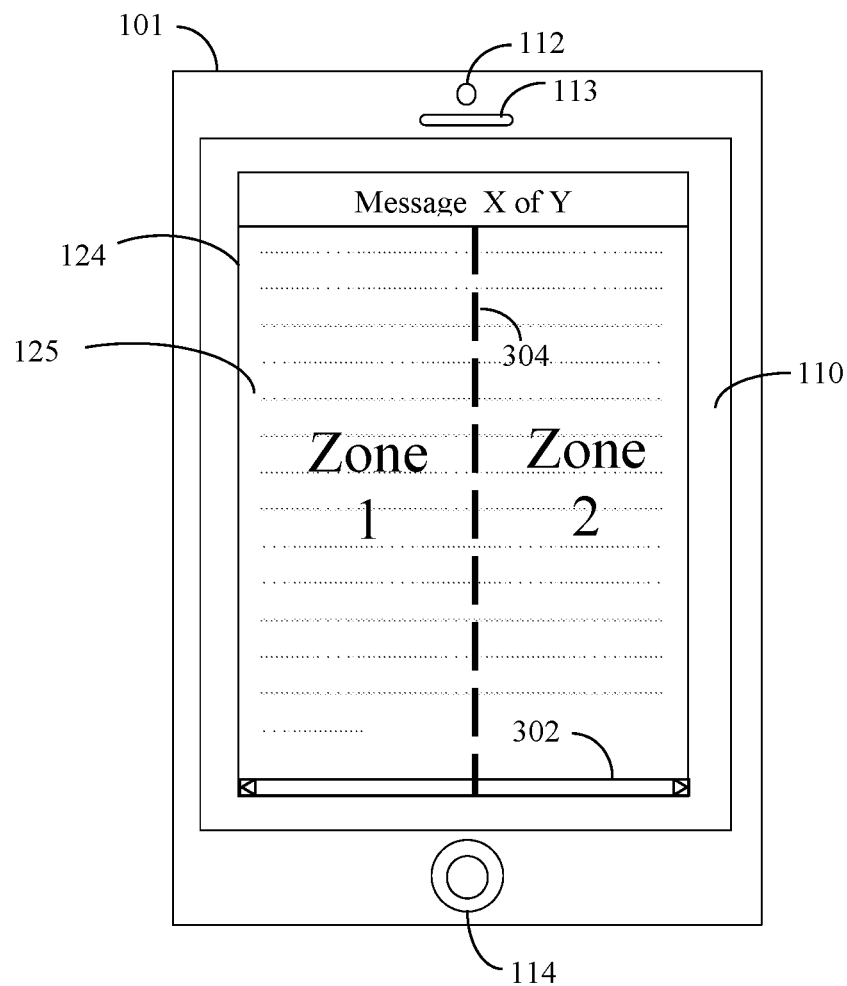

As shown in FIG. 3, a window 124 may in some cases display horizontally scrollable content 125, as denoted by horizontal scroll bar 302. In such cases, the gaze detection program module 123 may be configured for determining a left scroll zone ("Zone 1") and a right scroll zone ("Zone 2") separated by virtual divider 304 that extends vertically relative to the window 124. In the example of FIG. 3, the virtual divider 304 may be set as being approximately in the middle of the window 124 (i.e., approximately equally between the left and right sides of the window 124). It should be appreciated that the left Zone 1 and right Zone 2 do not need to be of approximately equal area; any relative areas will suffice as Tong as they result in usable scroll zones. Again, a dead zone is preferably positioned between the two scroll zones and/or a hysteresis is implemented to account for the effects of measurement errors and data noise.

In the case of horizontally scrollable content, defined scroll actions may include a "scroll right" action and/or a "scroll left" action. In particular, a scroll right action may be defined in terms of moving the content 125 to the left relative to the window 124 and a scroll left action may be defined in terms of moving the content 125 to the right relative to the window 124. As noted above, a scroll action may be defined in terms of scrolling for a determined period of time, until a gaze point 130 is detected as being moved within or outside of a defined zone of the window 124, or until a particular portion of the content 125 passes a certain position within the window 124. In the example of FIG. 3, the gaze detection program module 123 may be configured such that detecting a gaze point 130 within the left Zone 1 may initiate an associated scroll left action and detecting a gaze point 130 within the right Zone 2 may initiate an associated scroll right action.

Figure 4:
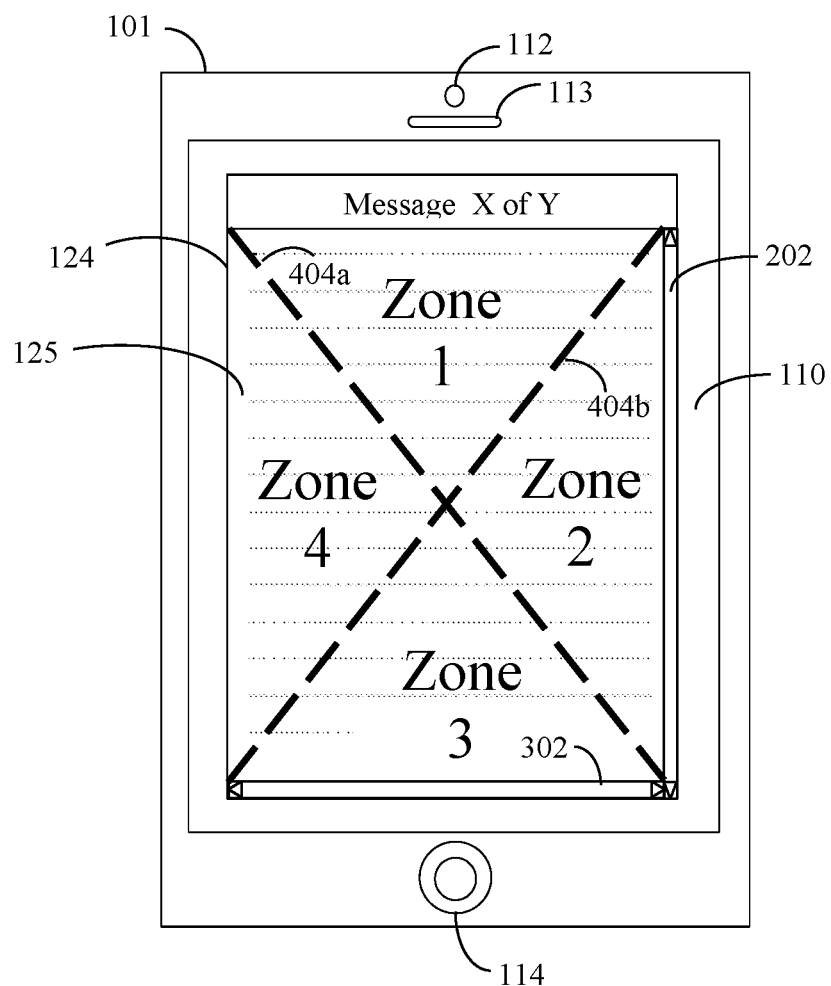

In some embodiments, more than two scroll zones may be defined for automatic scrolling based on gaze detection. For example, as shown in FIG. 4, a window may display content that is both vertically and horizontally scrollable, as denoted by the vertical scroll bar 202 and the horizontal scroll bar 302. In such cases, the gaze detection program module 123 may be configured for determining an upper scroll zone ("Zone 1"), a right scroll zone ("Zone 2"), a lower zone ("Zone 3") and a left scroll zone ("Zone 4"), which may be separated by two or more virtual dividers. In the illustrated example a first virtual divider 404a extends diagonally from the top left corner of the window 124 to the bottom right corner of the window 124 and a second virtual divider 404b extends diagonally from the top right corner of the window 124 to the bottom left corner of the window 124. It should be appreciated that the upper Zone 1, right Zone 2, lower Zone 3 and left Zone 4 do not need to be of approximately equal area; any relative areas will suffice as long as they result in usable scroll zones. Accordingly, in the example of FIG. 4, the gaze detection program module 123 may be configured such that detecting a gaze point 130 within the upper Zone 1 may initiate an associated scroll up action, detecting a gaze point 130 within the right Zone 2 may initiate an associated scroll right action, detecting a gaze point 130 within the lower Zone 3 may initiate an associated scroll down action and detecting a gaze point 130 within the left Zone 4 may initiate an associated scroll left action.

Again, a dead zone is preferably positioned between each of the adjacent scroll zones and/or a hysteresis is implemented to account for the effects of measurement errors and data noise. In some embodiments, adjacent scroll zones may be overlapping. For instance, all scroll zones may be rectangular such that zone 1 is the upper quarter of the screen, zone 2 the right quarter, zone 3 the lower quarter and zone 4 the left quarter. This configuration will give an overlap (essentially indicating scrolling in two directions), but it will also leave the central portion (half of the screen width and half of the screen height) as a dead zone allowing for quite large measurement errors in the determined gaze position without inducing erratic scrolling.

In some embodiments the gaze detection program module 123 may be configured to allow a user to define one or more "scroll points" for determining custom scroll zones used for automatic scrolling based on gaze detection. As shown by way of example in FIG. 5, a user may define multiple scroll points, such as an upper scroll point 502 and a lower scroll point 504. The user may thus set the position of the upper scroll point 502 to be any desired distance below the top of the window 124. In cases where the gaze detection system is more accurate, the user may desire to set the position of the upper scroll point 502 closer to the top of the window 124 and cases where the gaze detection system is less accurate, the user may desire to set the position of the upper scroll point 502 further below the top of the window 124. Similarly, the user may set the position of the lower scroll point 504 to be any desired distance above the bottom of the window 124 and such position may at least in part be determined based on the accuracy of the gaze detection system. In some embodiments, an interface may be provided for allowing the user to adjust the sensitivity of a scroll action by dynamically adjusting the position of a scroll point, i.e., to decrease or increase the size of a resulting scroll zone.

Figure 5:
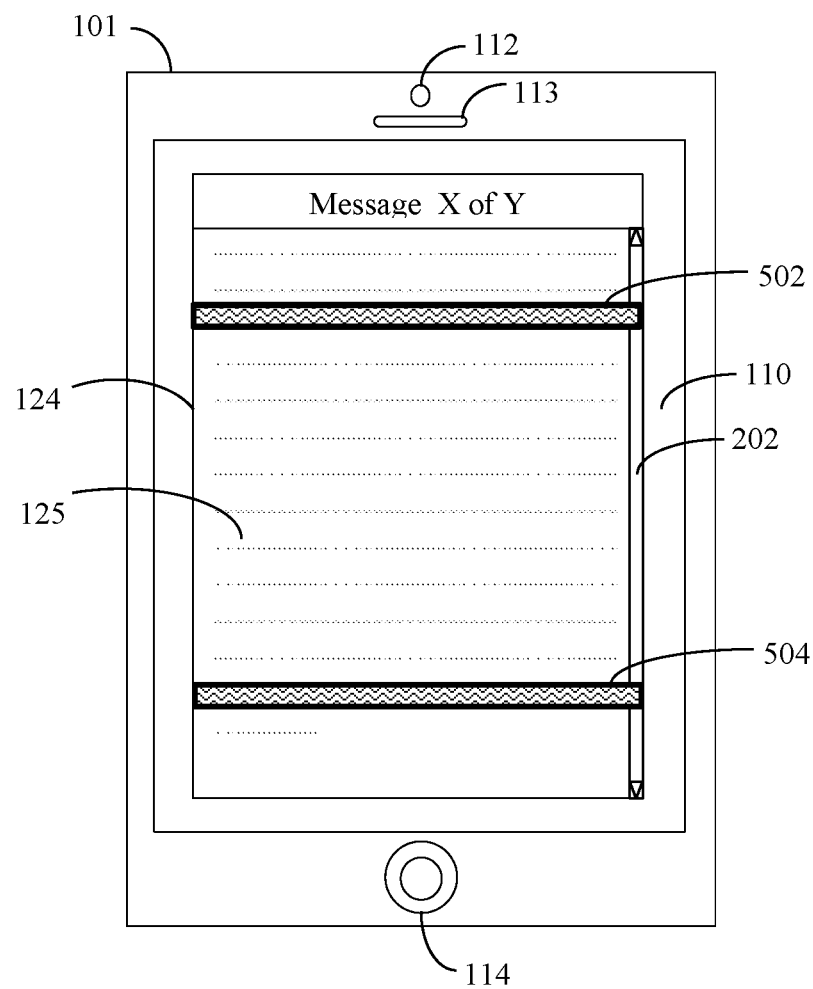

In the example of FIG. 5, the gaze detection program module 123 may be configured such that detecting a gaze point 130 above the upper scroll point 502 (i.e., in a first scroll zone) may initiate an associated scroll up action and detecting a gaze point 130 below the lower scroll point 504 (i.e., in a second scroll zone) may initiate an associated scroll down action. As with virtual dividers 204, 304, 404, user defined scroll points 502, 504 may be displayed in front of or behind displayed content 125 or may not be displayed at all. In some embodiments, user defined scroll points 502, 504 may be displayed only when the gaze detection system determines that the user is gazing at the window 124, as opposed to reading content 125 within the window. These and other manners for displaying and/or hiding user defined scroll points 502, 504 will occur to those of ordinary skill in the art.

Those skilled in the art will recognize that one or more scroll points may alternatively or additionally be defined so as to create vertical scroll zones for automatic horizontal scrolling based on gaze detection. As shown by way of example in FIG. 6, user defined scroll points may in some embodiments be defined as geometric shapes other than rectangles extending vertically, horizontally or diagonally across the window 124. In the illustrated example, an upper scroll point 602 is defined as an upward pointing triangle intended to indicate that the content 125 can be scrolled downward relative to the window 124 and a lower scroll point 604 is defined as a downward pointing triangle intended to indicate that the content 125 can be scrolled upward relative to the window 124. Any other geometric shapes may of course be used in other embodiments.

In embodiments where scroll points 602, 604 are defined as geometric shapes, the gaze detection program module 123 may be configured to determine when a gaze point 130 encompasses or is otherwise within a defined position relative to a scroll point 602, 604. In other words, the scroll zone associated with such a scroll point 602, 604 may be defined in terms of an area surrounding the scroll point 602, 604 and the size of that area may be varied depending at least in part on the sensitivity and accuracy of the gaze detection system. For example, if a gaze point is determined to be within a configurable number of inches, centimeters, millimeters or other distance in one or more direction (x,y) from a scroll point 602, 604 (e.g. in the direction of scroll relative to the scroll point or in all directions from the scroll point, etc.), the gaze detection program module 123 may be configured to initiate a scroll action associated with that particular scroll point 602, 604.

Figure 7:
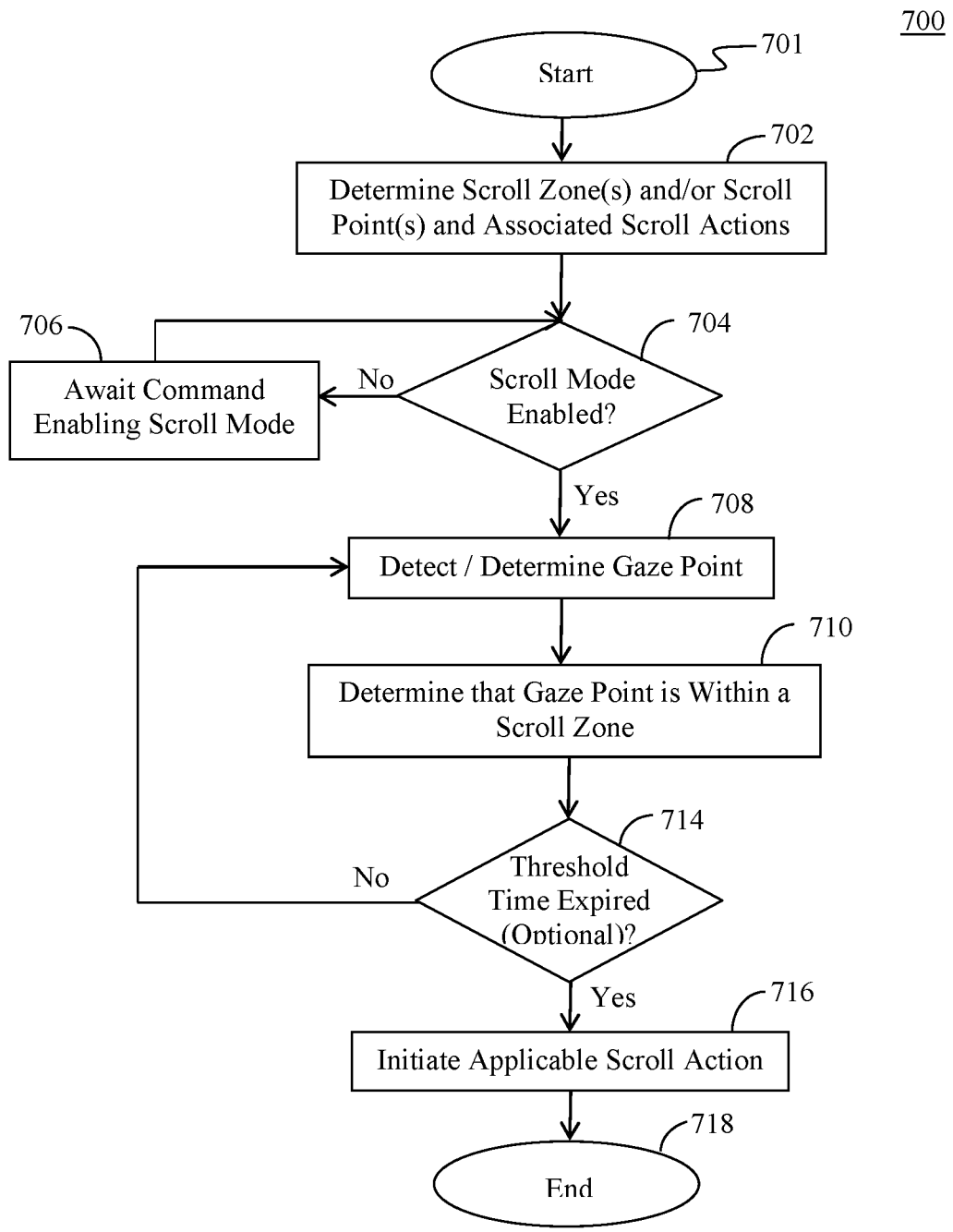
FIG. 7 is a flowchart illustrating an example of a method for automatic scrolling in response to gaze detection, in accordance with certain embodiments of the present invention.

FIG. 7 is a flowchart illustrating an example of a method 700 for implementing an automatic scroll function in response to gaze detection, according to certain embodiments of the present invention. As shown in FIG. 7, the method may begin with start step 701, in which a user is interacting with an application program 119 that renders content 125 within a window 124 displayed on a display screen 110. From there, the method advances to step 702, where applicable scroll zone(s) and/or scroll points are determined, along with their associated scroll actions. As mentioned, certain scroll zones and/or scroll points may be defined for certain application programs or types of application programs, certain window or display screen sizes and/or certain content or types of content. In some embodiments, default or preconfigured scroll zones may be used unless a user otherwise defines scroll point(s) or selects previously defined scroll point(s).

Next in step 704, a determination may be made as to whether scroll mode is enabled. In some embodiments, scroll mode may always be enabled. In other embodiments, the user may enable/disable scroll mode using any suitable commands, which may themselves be defined and/or configured by the user. If scroll mode is not enabled, the method loops between step 704 and step 706 to await an input command for enabling scroll mode. When it is determined at step 704 that scroll mode is enabled, the method advances to step 708 to detect or determine a gaze point resulting from the user viewing the displayed content 125. At step 710, the gaze point is determined to be within an applicable scroll zone or within a defined position relative to an applicable scroll point.

In step 714 a determination may optionally be made as to whether the gaze point remains within the applicable scroll zone beyond the expiration of a threshold time period. If the gaze point is determined not to remain with the applicable scroll zone beyond expiration of the threshold time period, it may be assumed that the user does not intend to initiate a scroll action and, in that case, the method loops back to step 708 to await detection or determination of the next gaze point.

The determination of whether the gaze point remains with the applicable scroll zone beyond a threshold time period may involve intelligent filtering. For instance intelligent filtering may involve filtering-out data samples that were not usable for determining a projected gaze position. Additionally the intelligent filtering may involve filtering-out a certain percentage of the gaze data samples that were not usable for determining a projected gaze position due to measurement errors. Preferably the gaze detection system should require that the last sample or a very recent sample of gaze data shows that the user is in fact gazing within the applicable scroll zone as part of this intelligent filtering.

If the determination of step 714 is performed and the gaze point is determined to remain with the applicable scroll zone beyond expiration of the threshold time period, the method advances to step 716 where the applicable scroll action is initiated. Following step 716, the method ends at step 718.

Although the automatic scrolling in response to gaze detection methods and other various methods and systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 7 may show certain functionality and operations described as performed by the gaze detection program module 123 described by way of example herein. If embodied in software, each box in the flowchart may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block in the flowchart may represent a circuit or a number of interconnected circuits to implement the specified logical function(s).

Although the flowchart of FIG. 7 shows a specific order of execution, it is understood that the order of execution may differ from that which is depicted. For example, the order of execution of two or more steps may be scrambled relative to the order shown. Also, two or more blocks shown in succession in FIG. 7 may be executed concurrently or with partial concurrence. Further, in some embodiments, one or more of the steps shown in FIG. 7 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Any logic or application described herein, including the gaze detection program module 123, application program module 119 and other processes a modules running on a client device 120, that comprises software or code can be embodied in any non-transitory computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, US flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A computing device, comprising:
    a display screen;
    a camera configured to capture image data corresponding to a user;
    a memory configured to store computer-executable instructions; and
    a processor configured to access the memory and execute the computer executable instructions to at least:
        provide content for presentation within a window of the display screen, the window being divided into a plurality of scroll zones;
        detect a gaze point of the user being within a first scroll zone of the plurality of scroll zones based at least in part on a portion of the image data;
        initiate a scrolling action based at least in part on the gaze point being within the first scroll zone; and
        upon termination of the scrolling action, decrease a size of the first scroll zone to define a contracted scroll zone.

2. The computing device of claim 1, wherein the processor is further configured to access the memory and execute the computer-executable instructions to at least:
    detect a subsequent gaze point of the user being within the contracted scroll zone based at least in part on a subsequent portion of the image data; and
    initiate a second scrolling action based at least in part on the subsequent gaze point being within the contracted scroll zone.

3. The computing device of claim 2, wherein detecting the subsequent gaze point being within the contracted scroll zone is based at least in part on the user's gaze being directed to an area bounded by a perimeter of the contracted scroll zone.

4. The computing device of claim 1, wherein decreasing the size of the first scroll zone comprises decreasing an area of the first scroll zone to define the contracted scroll zone.

5. The computing device of claim 1, wherein decreasing the size of the first scroll zone comprises decreasing the size of the first scroll zone for a predefined time period, after which a contracted size of the contracted scroll zone returns to the size of the first scroll zone.

6. The computing device of claim 1, wherein the computing device comprises a handheld portable device.

7. The computing device of claim 1, wherein:
    the computing device further comprises a bezel extending around a portion of a first perimeter edge of the computing device; and
    the camera is integrated into the bezel at a position between a second perimeter edge of the display screen and the first perimeter edge of the computing device.

8. The computing device of claim 1, wherein the camera is positioned to view a face of the user when the face of the user is directed toward the display screen.

9. The computing device of claim 1, wherein the scrolling action scrolls the content within the window.

10. A computer-implemented method, comprising:
    providing content for presentation within a window of a display screen, the window being divided into a plurality of scroll zones;
    detecting that a user gaze point is within a first scroll zone based at least in part on image data captured at least while a user views the content;
    initiate a scrolling action based at least in part on detecting that the user gaze point is within the first scroll zone; and
    upon conclusion of the scrolling action, decreasing a size of the first scroll zone to define a smaller scroll zone.

11. The computer-implemented method of claim 10, further comprising concluding the scrolling action based at least in part on detecting that the user gaze point has moved to a position outside of the first scroll zone.

12. The computer-implemented method of claim 10, wherein:
    the method further comprises receiving, via a user interface, a user input corresponding to the conclusion of the scrolling action; and decreasing the size of the first scroll zone is based at least in part on the user input.

13. The computer-implemented method of claim 10, further comprising:
    detecting that a subsequent user gaze point is within the contracted scroll zone based at least in part on subsequent image data; and
    initiating a second scrolling action based at least in part on detecting that the subsequent gaze point is within the contracted scroll zone.

14. The computer-implemented method of claim 13, wherein detecting that the subsequent gaze point is within the contracted scroll zone is based at least in part on the user's gaze being directed to an area bounded by a perimeter of the contracted scroll zone.

15. One or more non-transitory computer-readable media storing computer-executable instructions that, when executed by one or more computer systems, cause the one or more computer systems to perform operations comprising:

providing content for presentation within a window of a display screen, the window being divided into a plurality of display zones;

detecting that a user gaze point is within a first scroll zone based at least in part on image data captured at least while a user views the content;

initiate a scrolling action based at least in part on detecting that the user gaze point is within the first scroll zone, the scrolling action scrolling the content within the window; and upon conclusion of the scrolling action, decreasing a size of the first scroll zone to define a smaller scroll zone.

16. The one or more non-transitory computer-readable media of claim 15, wherein initiating a subsequent scrolling action of the content depends in part on a subsequent gaze point being detected in the smaller scroll zone.

17. The one or more non-transitory computer-readable media of claim 15, wherein the one or more non-transitory computer-readable media are included in a handheld portable device.

18. The one or more non-transitory computer-readable media of claim 15, wherein decreasing the size of the first scroll zone comprises decreasing an area of the first scroll zone to define the smaller scroll zone.

* * * * *